March 1, 1960 R. W. DALIN ET AL 2,926,352
CONTACT STUD INSERTING APPARATUS
Filed April 17, 1956 3 Sheets-Sheet 1
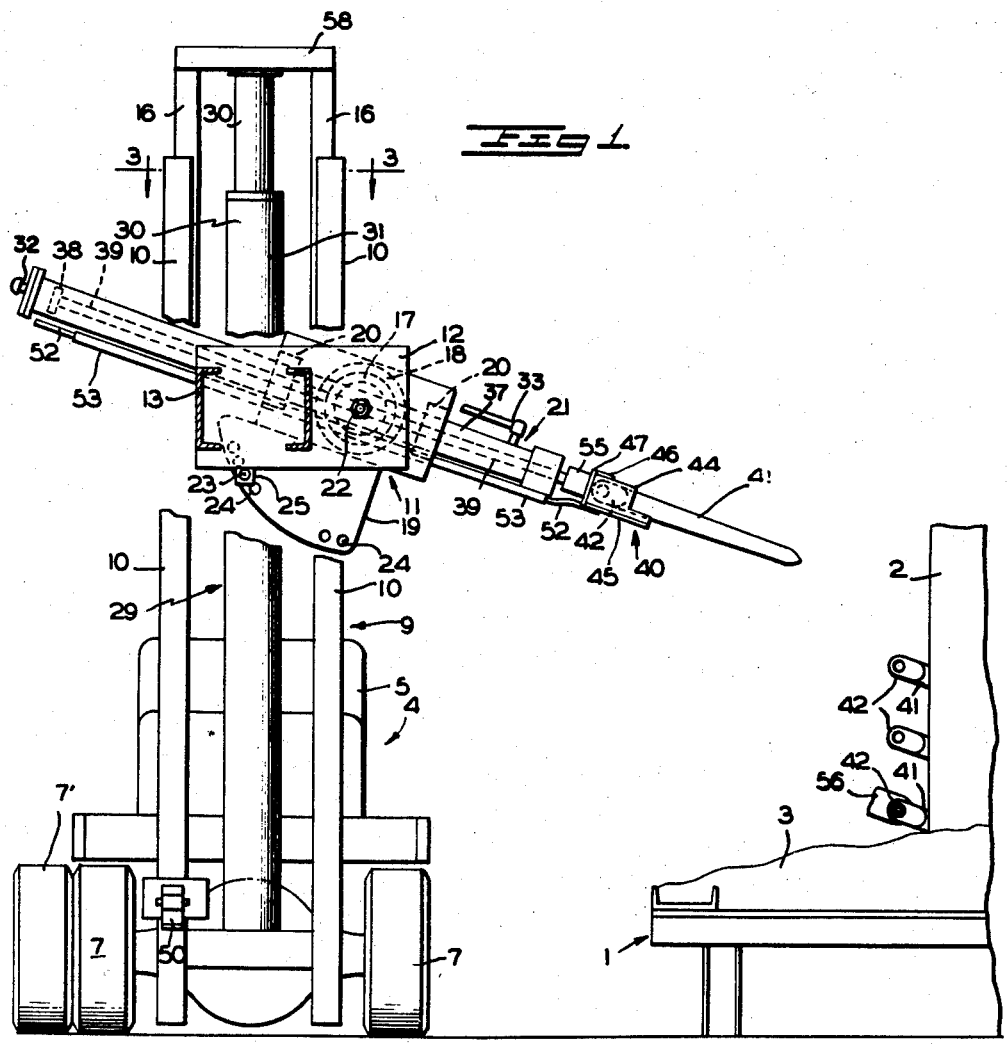
INVENTOR
ROBERT W. DALIN
GEORGE J. FLOBERG
WILLIAM J. REID
BY James E. Tooney
ATTORNEY

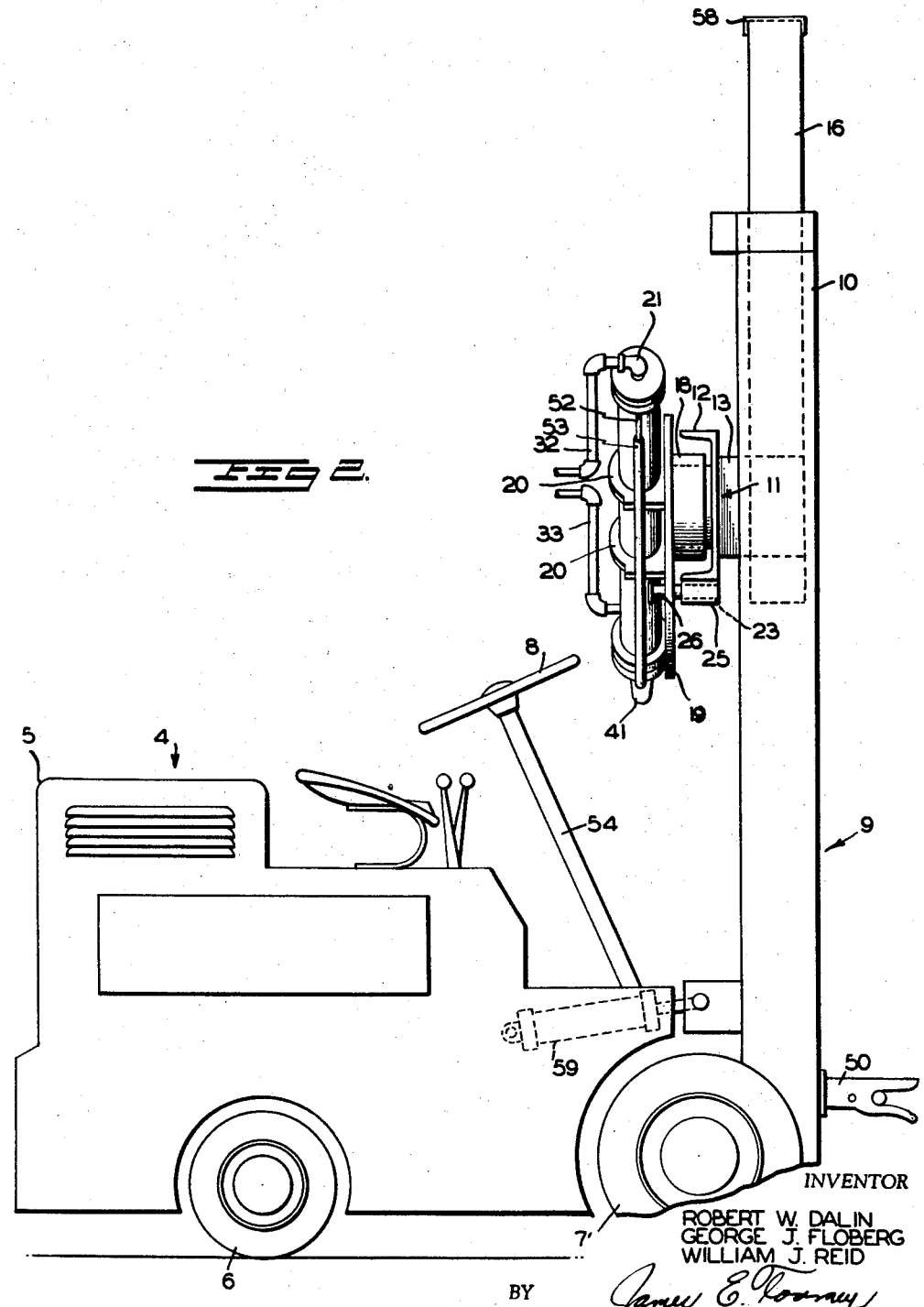

March 1, 1960  R. W. DALIN ET AL  2,926,352
CONTACT STUD INSERTING APPARATUS
Filed April 17, 1956  3 Sheets-Sheet 3
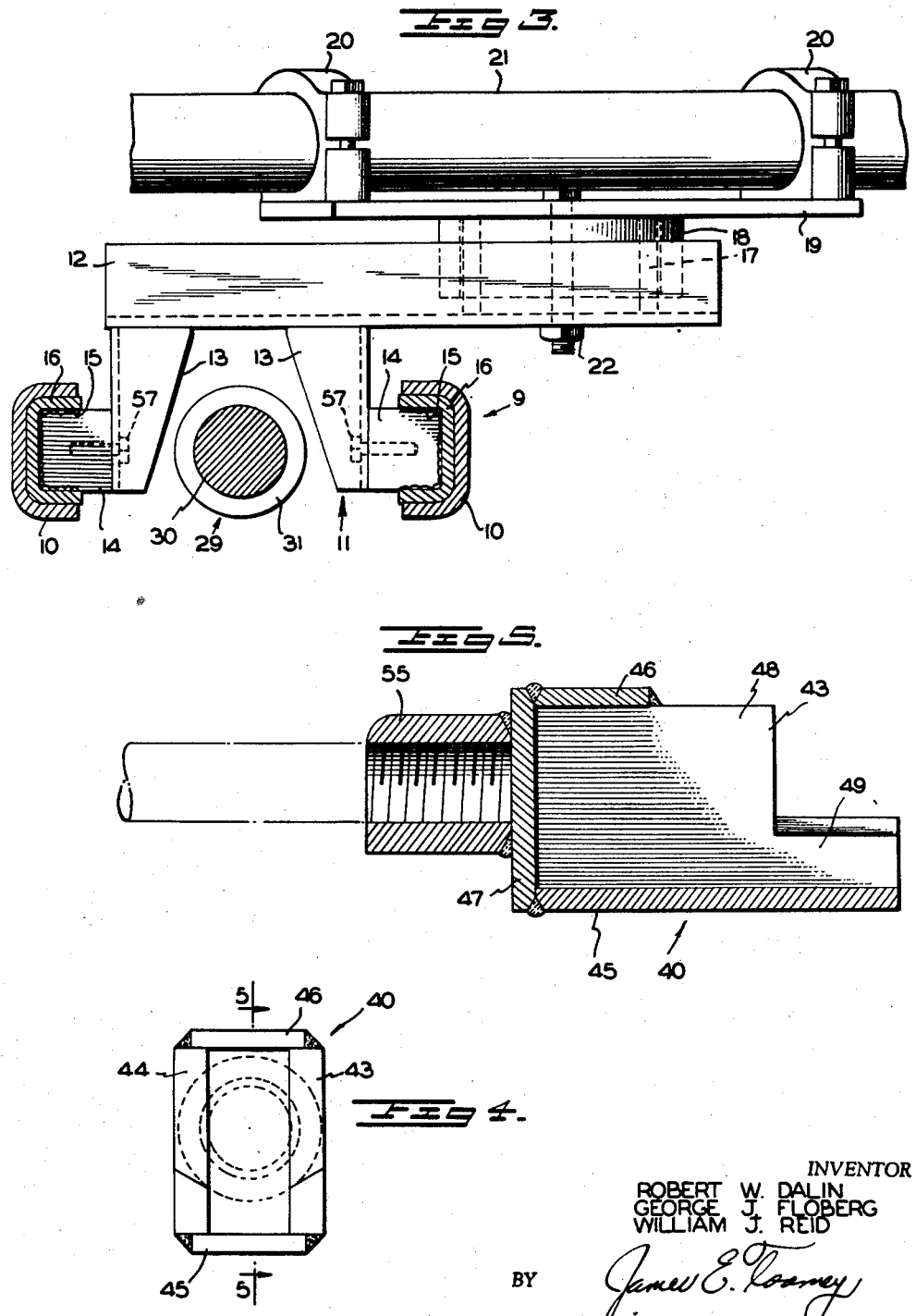
INVENTOR
ROBERT W. DALIN
GEORGE J. FLOBERG
WILLIAM J. REID
BY James E. Toomey
ATTORNEY

United States Patent Office 2,926,352
Patented Mar. 1, 1960

2,926,352

CONTACT STUD INSERTING APPARATUS

Robert W. Dalin, George J. Floberg, and William J. Reid, Tacoma, Wash., assignors to Kaiser Aluminum and Chemical Corporation, Oakland, Calif., a corporation of Delaware Application April 17, 1956, Serial No. 578,730

9 Claims. (Cl. 1—1)

This invention relates to apparatus for inserting contact studs in a continuous electrode as employed in the electrolytic reduction of alumina.

In the manufacture of aluminum by the electrolytic reduction of alumina, the typical cell employs a carbon anode. One type of anode employed for this purpose is the so called continuous or self baking anode wherein the electrode mass is supplied with the electrode paste material at the top of the electrode, and said electrode material is contained in a stationery electrode casing to retain the unbaked portions of the electrode mass until the mass has reached the point during its downward movement where it has been baked in fixed form. The baking of the electrode is accomplished by heat from the reduction operation and as the reduction process proceeds the bottom of the anode is burned and eroded off. Rows of contact studs are baked into the electrode mass and the lowermost row of contact studs in the electrode mass serve to conduct the electric current to the surface of the electrode mass through flexible connections to bus bar means in known manner. As the bottom of the anode is burned and eroded off, the electrode is periodically moved downward by a suitable mechanism to compensate for the portions which are burned and eroded off. When the lowermost row of contact studs approaches too closely to the molten metal contained in the cell the flexible connections are disconnected from the lowermost row of contact studs and connected to the second lowest row of contact studs. The lowermost studs are then withdrawn from the electrode and reconditioned e.g. cleaned, repaired etc. A row of new or reconditioned contact studs is then inserted just above the uppermost row of contact studs in the unbaked or partially unbaked portion of the electrode mass, which is comparatively soft thereby permitting insertion of said contact studs.

Inserting or planting these contact studs in the partially unbaked upper portion of the electrode mass is presently accomplished by hand and requires a crew of several men to insert the contact studs. A typical alumina reduction plant employs a large number of reduction cells and at least one crew of men is kept constantly busy replacing contact studs. Such practice possesses certain inherent disadvantages with regard to manpower, safety hazards and unsatisfactory dust conditions. First, insertion by hand requires a crew of several men to insert each stud and it requires an appreciable period of time per stud to accomplish the insertion. Often the portion of the electrode mass into which the studs are inserted is partially baked requiring a substantial amount of force to insert the contact stud. Second, the task not only is extremely laborious requiring several men to accomplish the task, but it is not without a sensible risk of personal danger by reason of the electrified condition of the equipment. Moreover in connection with reduction cell operation the alumina powder which is to be added to the fused electrolyte or bath quite frequently is placed on the top of the crust for preheating, whereby the presence of several workmen to insert the contact stud in the electrode mass stirs up an appreciable amount of this alumina powder creating a dusty atmosphere.

Accordingly, the primary purpose and object of this invention is to provide an improved means for inserting contact studs in the partially unbaked portion of the electrode mass of a continuous electrode type electrolytic cell which eliminates or substantially reduces many of the disadvantages of the prior art techniques.

It is a further object of this invention to provide a means for inserting contact studs in the unbaked or partially unbaked portion of a horizontal stud continuous electrode electrolytic cell wherein the number of men required to accomplish the task is substantially reduced.

It is a further object of this invention to present a means of inserting contact studs into the unbaked or partially unbaked portion of a horizontal stud continuous electrode electrolytic cell such that such contact stud will be properly positioned with a minimum expenditure of labor and time and with a minimum of danger to personnel from the electrified condition of the equipment.

A further object of this invention is to present a portable easily operated hydraulic cylinder type apparatus for inserting contact studs in the unbaked or partially unbaked portion of a horizontal stud type continuous electrode furnace.

A still further object of this invention is to provide a contact stud insertion instrumentality for a horizontal stud type continuous electrode electrolytic cell which is of a simple rugged construction efficient in operation and effective for eliminating the hazards and expense of manual insertion of contact studs.

These and other objects and advantages of the instant invention will be apparent from the following description thereof in conjunction with the accompanying drawings.

Stated generally the apparatus of this invention comprises a suitable motor driven wheeled vehicle having a vertically movable mounting frame rotatably supporting a plate on which is mounted a hydraulic cylinder. The hydraulic cylinder may be adjusted to one of several angles and has a socket on one end of its piston rod which is adapted to contain and hold the blunt end of a contact stud. In order to operate this device the motor driven vehicle is manipulated to a position whereby through proper adjustment of the vertical and angular position of the cylinder and piston assembly, the pointed end of the stud is positioned in the proper location for insertion into the electrode mass. Fluid under pressure is then applied to the end of the hydraulic cylinder furthest removed from the stud socket and acts against the suitable piston carrying the usual piston rod, whereby the stud which is contained in the socket carried at the end of the rod is forced into the electrode mass. Withdrawal of said piston rod within the cylinder slides the socket off the contact stud which has become anchored in the electrode mass whereby the apparatus is ready to insert another stud. A detailed discussion of a specific means for carrying out this invention will be described in conjunction with the following drawings, wherein identical parts are identified by identical numerals in the various views.

Figure 1 is a front elevational view of a motor driven wheeled vehicle having the hydraulic cylinder mechanism of this invention installed thereon illustrated in its operating relationship to an electrolytic cell, the cell being shown more or less diagrammatically.

Figure 2 is a side elevational view of the truck and hydraulic cylinder combination of Figure 1.

Figure 3 is a plan view detail of the mounting means for mounting the cylinder and piston assembly of Figure 1 when viewed along the line 3—3 of Figure 1.

Figure 4 is an end elevational view of the socket for holding the contact stud and Figure 5 is a cross sectional view of the socket of Figure 4 taken along the line 5—5 of Figure 4.

Referring now to the drawings and more particularly to Figure 1, the electrolytic cell or pot is indicated by the numeral 1, and the horizontal stud continuous electrode is indicated by the numeral 2. As is well known the electrode is suspended in the fused or molten electrolyte or bath, in spaced relation to the pot lining and a frozen crust forms between the electrode and the lining at the top of the bath. This crust is indicated by the numeral 3.

The truck or vehicle 4 which carries the operating mechanism by which the stud may be inserted may be of a conventional type such as that generally known as a fork lift. The vehicle 4 is more or less schematically represented in the drawings with various details of the fork lift type of vehicle known to the art omitted for the sake of clarity of illustration. The vehicle 4 generally comprises a suitable frame and housing 5, a pair of caster like rear wheels 6 and suitably mounted front wheels 7. An extra front wheel 7' may be employed on the side of the vehicle 4 away from the cell, for stability of vehicle 4 during insertion of the contact stud. A suitable conventional steering mechanism is generally provided employing a conventional steering wheel 8 which is suitably connected to caster like rear wheels 6 through steering column 54. A suitable prime mover such as a gasoline engine (not shown) is suitably mounted within the frame and housing 5 of vehicle 4. The motor (not shown) is suitably adapted to propel the vehicle, for example by driving the front wheels. The vehicle is thus self-propelled and is easily steered by the operator into position at pot 1 for forcing a stud into electrode mass 2.

The conventional fork lift type vehicle generally employs a mast 9 mounted on the forward end of vehicle 4. Mast 9 generally comprises a pair of outer guide channels 10 and a pair of inner guide channels 16. The conventional fork lift vehicle usually includes a vertically movable apron which runs inside the inner guide channels and to which the fork is attached. However, for application to this invention such a fork and apron are dispensed with. For purposes of this invention, a mounting frame 11 is employed which comprises a large channel member 12 and two smaller channel members 13 mounted near one end of large channel member 12. Suitably affixed to inner guide channel 16 by means such as welds 15 are mounting blocks 14. The extremities of smaller channel members 13 are suitably affixed to mounting blocks 14 by means such as bolts 57.

At the end of large channel member 12 on the side opposite the side to which small channel members 13 are affixed, a suitable cylindrical member 17 is affixed by suitable means such as welding. A second cylindrical member 18 having an inside diameter substantially the same as the outside diameter of cylindrical member 17 is adapted to fit over the outside of said cylindrical member 17. The side of cylindrical member 18 away from large channel member 12 is suitably affixed as by welding to a plate 19. Plate 19 and cylindrical member 18 are maintained on cylindrical member 17 through the use of a suitable fastener such as a bolt and nut means 22, the bolt passing axially through cylindrical members 17 and 18. From this description when taken in conjunction with the drawings, it can be seen that plate 19 may be rotated about the axis of cylindrical members 17 and 18.

Plate 19 has a configuration as shown in Figure 1 with the lower portion curved. Mounted on the upper portion of plate 19 by means of suitable clamps 20 is a cylinder and piston assembly 21. Along the lower curved portion of plate 19 near the periphery of said curve is a series of spaced holes 24 passing through said plate. A suitable hole 23 generally of the same diameter as the holes 24 in plate 19 is located in a block 25 suitably affixed as by welding to the bottom of large channel member 12. Hole 23 is so positioned that rotation of plate 19 about the axis of cylindrical members 17 and 18 will in turn move each hole 24 into registry with hole 23. Thus by means of a suitable pin 26, cylinder and piston assembly 21 may be maintained in any angular position by passing pin 26 through the proper hole 24 and hole 23. In order to change the angular position of cylinder and piston assembly 21, pin 26 is removed and cylinder and piston assembly 21 rotated about the axis of members 17 and 18 to the desired position after which pin 26 is replaced by passing through the proper hole 24 in plate 19 and into hole 23.

The conventional fork lift type vehicle such as indicated by the numeral 4 generally has a hydraulic system for moving the previously referred to apron and fork up or down. This is accomplished by the use of a cylinder and plunger assembly 29 comprising a cylinder 31 and a plunger 30. The top of plunger 30 is affixed to inner guide channels 16 through suitable means such as a horizontal member 58. Vertical movement of plunger 30 accordingly results in vertical movement of inner guide channel 16, which in turn results in vertical movement of mounting frame 11 affixed to channels 16.

In order to accomplish vertical adjustment of mounting frame 11, a suitable hydraulic system is provided. Since this hydraulic system is conventional it will not be described in detail or shown in the drawings. However, in general it will comprise a source of hydraulic fluid under pressure such as a pump driven by the drive motor for the vehicle 4, and a suitable hydraulic fluid return means which will generally include a reservoir tank. The pump will circulate the hydraulic fluid through the system and back to the reservoir. Connected to this system is generally a suitable cylinder and piston assembly 59 which is adapted to tilt mast 9 and the pressure to this cylinder and piston assembly is controlled by a suitable valve which may easily be operated by the driver. Also connected to the system is a line to the bottom of cylinder and plunger assembly 29, a valve being provided in said line to control the pressure from the system to the bottom of cylinder and plunger assembly 29. This latter valve is also in a position where it may easily be controlled by the driver. Generally the fork lift truck type of vehicle relies on the weight of the material being lifted for downward movement and accordingly the position of mounting frame 11 is controlled by opening or closing the valve to the bottom of cylinder and plunger assembly 29.

Cylinder and piston assembly 21 generally comprises a cylinder 37, suitable fluid pressure conduits 32 and 33, one each being connected to its opposite end, a piston 38 and a piston rod 39. The extremity of piston rod 39 has affixed thereto a suitable socket 40 adapted to hold therein the blunt end of a contact stud 41. In order to be able to connect the flexible connection from the current supplying bus to the contact studs 41, flat sides are provided on the blunt end portion of each contact stud 41. This stud must be inserted with the flat sides vertical in order to make the connection. Since piston rod 39 is free to turn within cylinder 37 means comprising a guide bar 52, and slide tube 53 are provided. Slide tube 53 may be rigidly affixed as by welding to the bottom of cylinder and piston assembly 21 in a position parallel to the axis of cylinder 37 and piston rod 39. Guide bar 52 closely fits within slide tube 53 and is slideable therein. One end of guide bar 52 is affixed to socket 40 by suitable means such as welding. This arrangement prevents rotation of piston rod 39 within cylinder 37 thereby maintaining the flat sides of end portion 42 of each contact stud 41 vertical.

The conventional contact stud 41 is generally round in cross section except the above mentioned portion 42 at the blunt end. Accordingly socket 40 has a generally rectangular cross section as shown in Figure 4. However the end portion is partially cut away to provide for the portion of the contact stud having a round cross section. Socket 40 generally comprises five plates, two step shade side plates 43 and 44, a bottom plate 45 of a length equal to the longest portion of side plates 43 and 44, a short top plate 46 and a rectangular end plate 47. This socket is assembled by suitable means such as welding, as shown in Figures 4 and 5. The portion 48 of side plates 43 and 44 which is the full width of socket 40 has a length sufficient as to accommodate the flattened end portion 42 of contact stud 41. The distance between side plates 43 and 44 is about equal to or slightly greater than the thickness of flattened end portion 42 of contact stud 41 providing a close fit for flattened end portion 42. The cut away portion 49 is cut away a sufficient amount to allow for the round portion of contact stud 41 whereby the outer periphery of said round portion may rest on the diagonally cut upper edges of cut away portion 49 of side plates 43 and 44. This design permits easy insertion of the flat portion of contact stud 41 in socket 40 and also provides a firm hold on stud 41. This design with the partially open upper portion of the socket permits easy removal of the socket from the stud after it has been inserted in the electrode mass, by simply withdrawing the socket from the stud. A suitable circular member such as a pipe 55 is suitably affixed as by welding to end plate 47. Pipe 55 is adapted to fit over the end of piston rod 39 furthest removed from piston 38 and is affixed thereto by suitable means such as welding.

It will be appreciated that the piston and cylinder assembly 21 functions as is customary for a conventional double acting hydraulic motor. In other words, each end of the cylinder 37 is connected to a suitable conduit 32 and 33, respectively, through which the motivating fluid may enter into and exit from the ends of the cylinder 37. Thus, when fluid is admitted via conduit 32 into the head or left end of the cylinder 37 the piston 38 and associated piston rod 39 will be moved toward the right or rod end thereof as shown in Figure 1. The piston rod 39 thus emerges from within the cylinder 37. At the same time such fluid as may be present on the opposite or right side of the piston 38 within the cylinder 37 will be permitted to exhaust therefrom through conduit 33 whereby movement of the piston 38 and its associated rod 39 may be carried out.

Similarly, by merely reversing the flow in conduits 32 and 33, the piston 38 can be caused to move toward the left or head end of the cylinder 37, as shown in Figure 1, and thus the piston rod 39 is caused to be telescoped or withdrawn within the cylinder 37. The piston 38 is then exposed to fluid via conduit 33 on its rod side while the fluid on the opposite or head end thereof is being exhausted through the conduit 32. The described fluid flow and control of the double acting hydraulic piston and cylinder assembly 21 may be obtained by the use of a simple and conventional reversing valve (not shown) having suitable ports connected to a source of pressure, a pump or the like, and a suitable reservoir such as a tank, and including an internal ported means whereby one or the other of the respective conduits 32 and 33 may be alternatively connected by movement of the ported means to either the source of fluid, the pump, or the reservoir. Such valves are common in the art and hence, need not be described herein in detail.

Vehicle 4 may be provided with a suitable trailer hitch 50 whereby it may tow or push a conventional trailer (not shown) containing studs for insertion in the electrode mass.

Operation of this invention is as follows:

First the vehicle 4 is moved into position along the side of pot 1. Cylinder and piston assembly 21 is then rotated about the axis of cylindrical members 17 and 18 to the desired angle. Pin 26 is then inserted through the proper hole 24 in plate 19 and into hole 23, thus maintaining cylinder and piston assembly 21 at the proper angle. A contact stud 41 is then inserted in socket 40 after which the vehicle is moved into the desired position. Exact positioning required to place the contact stud 41 in the electrode mass in the proper position and at the proper angle is accomplished by adjusting tilting cylinder and piston assembly 59 and vertical cylinder and plunger assembly 29. The above mentioned reversing valve is then turned to the proper position to connect pipe 32 to the pump or source of hydraulic fluid and to connect pipe 33 to the fluid return means whereby the piston 38, and piston rod 39 are forced out of cylinder 37, and socket 40 and contact stud 41 are moved to the right. This forces contact stud 41 into the electrode mass 2. When contact stud 41 has been forced into the electrode mass 2 the desired distance, the reversing valve is reversed. Piston 38 and piston rod 39 are then retracted into cylinder 37 moving socket 40 to the left and off of contact stud 41. When piston 38 is fully retracted into cylinder 37, the apparatus is in position for inserting another contact stud.

While there has been shown and described hereinabove the present preferred embodiments of this invention, it is to be understood that the invention is not limited thereto and that various changes, alterations, and modifications can be made thereto without departing from the spirit and scope thereof as defined in the appended claims wherein:

What is claimed is:

1. An apparatus for inserting contact studs into the electrode mass of a horizontal stud continuous electrolytic cell comprising a self-propelled vehicle movable along the cell, a substantially vertical mast mounted on said vehicle, hydraulic cylinder and piston means pivotally mounted on said mast to permit rotation about an axis transverse to the longitudinal dimension of said cylinder and piston means, the piston rod of said cylinder and piston means having a socket affixed to the end furthest removed from the piston, said socket adapted to closely fit one end portion of a contact stud while being easily removable therefrom, hydraulic means for actuating said cylinder and piston means, pivotal mounting means for said piston and cylinder comprising a pair of concentrically mounted hollow cylindrical members one fitted closely within the other, each being free to turn relative to the other, one of said cylindrical members being affixed at one end to said mast and the other of said cylindrical members being affixed at its opposite end to said cylinder and piston means, means for maintaining said cylindrical members in concentric relation, said cylinder and piston mounting means further including a suitable plate affixed to said cylinder and piston means, said plate in turn being affixed to one of said hollow cylindrical members, said plate having a series of spaced apertures therein, a member having an aperture therein fixed to said mast in such a position that as said plate and said cylinder and piston assembly are rotated about the axis of said cylindrical members, each aperture of said spaced series of apertures in said plate is selectively movable into registry with said aperture in said member, and pin means insertable in said apertures when in registry to fix the angular position of said plate and said cylinder and piston means.

2. An apparatus for inserting contact studs into the electrode mass of a horizontal stud continuous electrolytic cell comprising a self-propelled vehicle movable along the cell, a substantially vertical mast mounted on said vehicle, hydraulic cylinder and piston means pivotally mounted on said mast to permit rotation about an axis transverse to the longitudinal dimension of said cylinder and piston means, the piston rod of said cylinder and piston means having a socket affixed to the end furthest removed from the piston, said socket adapted to closely fit one end portion of a contact stud while being easily removable therefrom, said socket having a rectangular cross-section and a partially open upper portion and being comprised of two step-shaped side plates, a bottom plate of a length equal to the longest dimension of said side plates, a relatively short top plate and an end plate, said plates being joined each to the other, hydraulic means for actuating said cylinder and piston means, pivotal mounting means for said piston and cylinder comprising a pair of concentrically mounted hollow cylindrical members one fitted closely within the other, each being free to turn relative to the other, one of said cylindrical members being affixed at one end to said mast and the other of said cylindrical members being affixed at its opposite end to said cylinder and piston means, means for maintaining said cylindrical members in concentric relation, said cylinder and piston mounting means further including a suitable plate affixed to said cylinder and piston means, said plate in turn being affixed to one of said hollow cylindrical members, said plate having a series of spaced apertures therein, a member having an aperture therein fixed to said mast in such a position that as said plate and said cylinder and piston assembly are rotated about the axis of said cylindrical members, each aperture of said spaced series of apertures in said plate is selectively movable into registry with said aperture in said member, and pin means insertable in said apertures when in registry to fix the angular position of said plate and said cylinder and piston means.

3. In a mobile apparatus for placing contact studs in an electrode mass and including a wheeled frame having a vertical mast, hydraulic means for tilting said mast, and means for forcing a stud in said electrode mass, a mounting means for said stud forcing means comprising a frame vertically movable on said mast, hydraulic means for moving said frame, a pair of concentrically arranged cylindrical members, one of said cylindrical members being fixed to said frame, the other of said cylindrical members being fixed to said stud forcing means and being freely rotatable with respect to said first mentioned cylindrical member, means fixing said cylindrical members in concentric relation, means for locking said stud forcing means in a selected angular position with respect to said mast, said means comprising a plate interposed between and fixed to said stud forcing means and said second mentioned cylindrical member, said plate having a plurality of apertures therein arranged in an arc, a member fixed to said frame and having an aperture therein whereby a selected one of said arcuately arranged apertures in said plate may be brought in registry therewith, locking means for passing through the registered apertures and locking said plate in any one of a selected position with respect to said member.

4. In a mobile apparatus for emplacing contact studs in an electrode mass, a stud driving mechanism comprising a double acting hydraulic piston and cylinder assembly including a piston rod telescopically movable into and out of said assembly, and means on said rod for engaging and holding a contact stud prior to and during placement of the stud into an electrode mass by movement of said piston rod out of said piston and cylinder assembly, said engaging and holding means comprising a socket having a partially open upper portion in which the head portion of a contact stud is frictionally engaged and held prior to being forced into said electrode mass, said socket releasing the contact stud upon movement of the piston rod into said piston and cylinder assembly.

5. An apparatus for forcing contact studs into an electrode mass as defined in claim 4 further including means acting between said contact stud holding means and said piston and cylinder assembly to prevent rotation of said last mentioned means with respect to said piston and cylinder assembly.

6. In an apparatus for placing contact studs in an electrode mass comprising means for engaging and holding a contact stud prior to and during emplacement in an electrode mass, means for moving said stud engaging means toward and away from said electrode mass, said stud engaging and holding means comprising a socket affixed to said moving means, said socket including two step-shaped side plates, a bottom plate of a length equal to the longest dimension of said side plates and fixed thereto, a short top plate fixed to a portion of the top of said step-shaped side plates and a back plate fixed to said top, bottom and said side plates to form therewith a generally rectangular socket having an open top portion, said socket being of such size as to receive and hold an end of a contact stud while being readily releasable therefrom upon movement of said moving means away from said electrode mass.

7. An apparatus as defined in claim 6 including further, means acting between said forcing means and said stud receiving socket to prevent rotation of said socket relative to said forcing means.

8. An apparatus as defined in claim 7 wherein said forcing means is comprised of a double acting hydraulic piston and cylinder assembly.

9. An apparatus as defined in claim 8 wherein said means acting between said forcing means and said stud receiving socket comprises a tubular member fixed to said piston and cylinder assembly, and a rod member fixed to the bottom of said socket member and slidably disposed within said tube.

References Cited in the file of this patent

UNITED STATES PATENTS

| | | |
|---|---|---|
| 134,083 | McKay | Dec. 17, 1872 |
| 150,886 | Pattison | May 12, 1874 |
| 278,892 | Day | June 5, 1883 |
| 1,195,549 | Baker | Aug. 22, 1916 |
| 1,196,704 | Kroder | Aug. 29, 1916 |
| 1,286,740 | Oehm et al. | Dec. 3, 1918 |
| 1,310,590 | Warnke | July 22, 1919 |
| 2,044,877 | Curtis | June 23, 1936 |
| 2,325,691 | Litwin | Aug. 3, 1943 |
| 2,335,172 | Cornett | Nov. 23, 1943 |
| 2,448,300 | Eaddy | Aug. 31, 1948 |
| 2,520,390 | Feucht | Aug. 29, 1950 |
| 2,743,444 | Thomas | May 1, 1956 |